US007111165B2

(12) United States Patent
Lidén et al.

(10) Patent No.: US 7,111,165 B2
(45) Date of Patent: Sep. 19, 2006

(54) KEY AND LOCK DEVICE

(75) Inventors: Inge Lidén, Eskilstuna (SE); Rolf Norberg, Täby (SE); Björn Magnusson, Tumba (SE); Hannu Sivonen, Marjovaara (FI); Gudrun Brennecke, Berlin (DE); Christophe Chanel, Berlin (DE); Jürgen Krühn, Berlin (DE); Bernd Kikebusch, Berlin (DE); Arnaud Lefebvre, Troyes (FR)

(73) Assignee: Assa Abloy AB, Stockholm (SE)

( * ) Notice: Subject to any disclaimer, the term of this patent is extended or adjusted under 35 U.S.C. 154(b) by 690 days.

(21) Appl. No.: 09/802,931

(22) Filed: Mar. 12, 2001

(65) Prior Publication Data

US 2001/0021977 A1 Sep. 13, 2001

(30) Foreign Application Priority Data

Mar. 10, 2000 (SE) .................................. 0000795

(51) Int. Cl.
*H04L 9/00* (2006.01)

(52) U.S. Cl. ........................ 713/170; 380/283; 70/285

(58) Field of Classification Search ................ 713/201, 713/170–171, 169; 340/5.65, 5.55, 5.73, 340/285.31, 825.31; 235/380; 70/285, 283, 70/278; 380/277, 281, 30, 283
See application file for complete search history.

(56) References Cited

U.S. PATENT DOCUMENTS

| | | | | |
|---|---|---|---|---|
| 4,209,782 | A | 6/1980 | Donath et al. | |
| 4,558,175 | A | 12/1985 | Genest et al. | |
| 4,736,419 | A * | 4/1988 | Roe | 713/185 |
| 4,912,310 | A | 3/1990 | Uemura et al. | |
| 5,541,581 | A * | 7/1996 | Trent | 340/5.55 |
| 5,749,253 | A | 5/1998 | Glick et al. | |
| 6,000,609 | A | 12/1999 | Gokcebay et al. | |
| 6,005,487 | A | 12/1999 | Hyatt, Jr. et al. | |
| 6,343,361 | B1 * | 1/2002 | Nendell et al. | 713/171 |
| 6,384,711 | B1 * | 5/2002 | Cregger et al. | 340/5.65 |
| 6,822,553 | B1 * | 11/2004 | Henderson et al. | 340/5.73 |

FOREIGN PATENT DOCUMENTS

| | | |
|---|---|---|
| DE | 44 05 693 | 8/1995 |
| DE | 19 600 556 | 7/1997 |
| EP | 0 410 024 | 1/1991 |
| WO | 90/15211 | 12/1990 |
| WO | 98/25000 A1 | 6/1998 |

* cited by examiner

*Primary Examiner*—Kim Vu
*Assistant Examiner*—T. B. Truong
(74) *Attorney, Agent, or Firm*—Sughrue Mion, PLLC

(57) ABSTRACT

A method of authorizing a key or lock device comprises the following steps: a first user device and a first system device used in a first level of a lock system, such as at a manufacturer, are created. A first encryption key is stored in the first user device and the first system device. When the user device is to be shipped to a second level of the lock system, such as a locksmith, an authentication process is carried out between the first user device and the first system device using the first encryption key stored therein. In case the authentication process was successful, a software operation is carried out by the first system device, by which the first encryption key stored in the first user device is replaced by a second encryption key. This second encryption key is stored in second system and user devices used in the second level of the lock system, thereby making the first user device operable with the second system and user devices. This prevents unauthorized use of keys and locks.

11 Claims, 7 Drawing Sheets

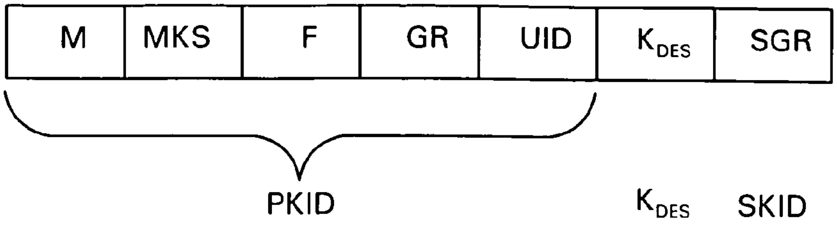
Fig. 3a
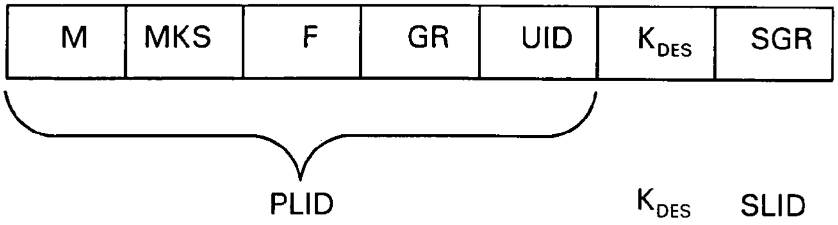
Fig. 3b
Fig. 5a
Fig. 5b
Fig. 5c
Fig. 5d
Fig. 5e
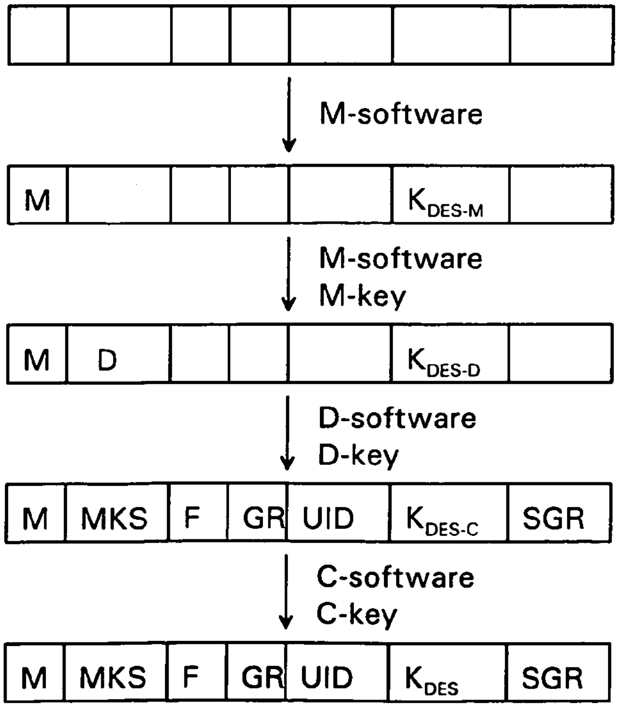

KEY AND LOCK DEVICE

FIELD OF INVENTION

The present invention relates generally to key and lock devices, and more specifically to an electromechanical lock device suitable for use in a lock system wherein a variable electronic encryption key is used to increase the security between different levels of the lock system during manufacturing steps. The invention also relates to a method and a system using a variable encryption key.

BACKGROUND

It is previously known electromechanical lock systems wherein keys are assigned to different users in a conventional way similar to the way keys are distributed in a mechanical lock system. However, this distribution is difficult to accomplish and it is a cumbersome procedure to distribute new keys. Also, there is always a danger that an unauthorised person obtains a system key, leading to security risks etc.

Another problem is that electronic codes can be copied, e.g. by "recording" the code by means of a reader, whereby copies can be present in the key system without the knowledge of the system owner.

Yet another problem of prior art is that key blanks can be used by anyone, posing a security risk.

The U.S. patent document U.S. Pat. No. 6,005,487 (Hyatt, Jr. et al) discloses an electronic security system including an electronic lock mechanism and an electronic key. To eliminate the requirement of costly rekeying in the event of a key loss or to eliminate the possibility of internal fraud and theft, the system according to Hyatt, Jr et al provides for a change of an ID code of a key or a lock. However, the above mentioned problems of prior art are not addressed by this system.

SUMMARY OF THE INVENTION

An object of the present invention is to provide an electromechanical key and lock device of the kind initially mentioned and used in a system wherein the distribution and authorisation of keys and locks between manufacturer, distributor and customer have a high level of security.

Another object of the present invention is to provide an electromechanical lock device wherein the distribution and authorisation of keys are facilitated.

Another object is to provide a key device, which is difficult to copy without the knowledge of the system owner.

Another object is to provide a key blank that is limited regarding its use to a limited number of distributors.

Another object is to provide for easy and secure adding of keys and locks to a lock system.

Another object is to provide a method and a system for storing and displaying information about a master key system in a secure way.

Another object is to provide a method and a system for exchanging information between manufacturer, distributor and end user of a key and lock device.

The invention is based on the realisation that the above mentioned problems of prior art can be solved by providing and changing electronic codes in keys and locks, wherein said codes are used for encrypted communication between keys and locks and between different parties involved with the building and maintenance of a lock system.

According to the present invention there is provided a method as defined in claim 1.

According to the present invention there is also provided a key and lock device as defined in claim 9 and a key and lock system as defined in claim 12.

Further preferred embodiments are defined in the dependent claims.

With the method, the key and lock device and the system according to the invention, at least some of the above-discussed problems with prior art are solved.

BRIEF DESCRIPTION OF DRAWINGS

The invention is now described, by way of example, with reference to the accompanying drawings, in which:

FIGS. 3*a* and 3*b* are representations of the information elements of a key and lock device, respectively, according to the invention;

FIG. 5 is an overview of electronic key code elements provided in a key and lock device according to the invention;

DETAILED DESCRIPTION OF THE INVENTION

Preferred embodiments of the invention will now be described. In order to provide a clear description, the expression "key" will be clarified by the addition of "physical" if key refers to a physical key, i.e., a mechanical key adapted for use with a lock, and by the addition of "electronic" or "encryption" if key refers to an electronic key, such as an encryption key.

In addition, the prefix "e" is used for denoting encrypted information and the prefix "d" for denoting decrypted information. The encryption key used follows the prefix. Thus, for example eKx(File1) denotes a File1 encrypted with the encryption key "Kx".

It this description, reference is sometimes made to a "device". A device in the context of the invention is to be interpreted as a key or lock device.

Figure 1:
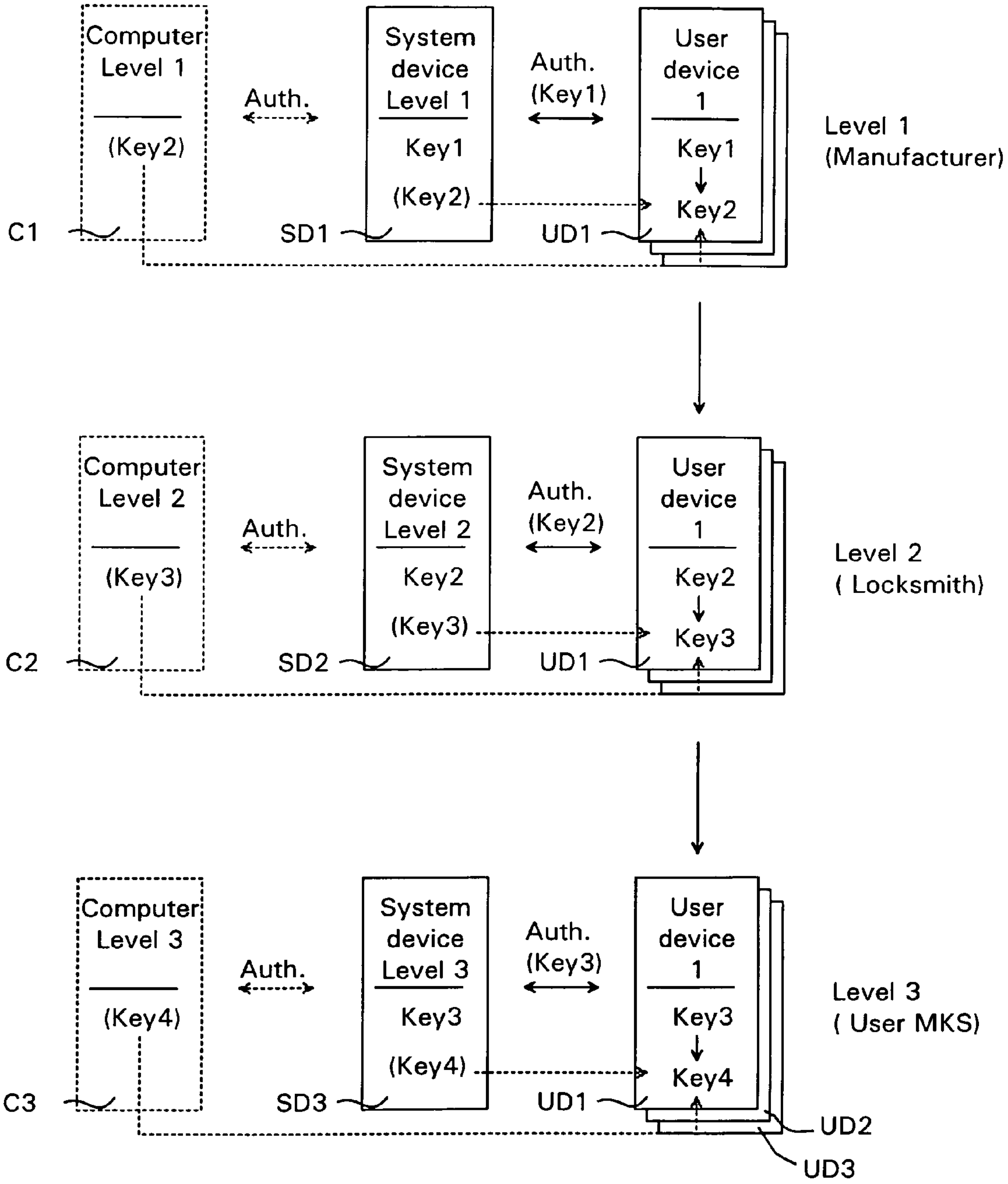
FIG. 1 is a diagram explaining the basic idea of the present invention.

Initially, the basic idea behind the present invention will be explained with reference to FIG. 1, which shows a diagram of different parts in a lock system according to the invention. Three "levels" of a lock system is shown, labelled "Manufacturer", "Locksmith", and "User MKS", respectively. At each level, there is a system device and optionally a computer at one or more of the levels. User devices, such as keys and/or locks, are shown at the different levels. However, "User device 1" is the same device throughout the levels, albeit in different "modes".

Each system and user device has a hidden encryption key, "Key1", "Key2" etc., stored therein. These encryption keys are used for authentication processes between system and user devices as well as between different user devices, i.e., between keys and locks at the end user level. The encryption keys stored in user devices are variable, i.e., they can be changed by means of a system device, possibly together with a computer software, as will be explained in the following.

Initially, a user device UD1 stored at Level 1 has an encryption key "Key1" provided during the manufacturing of the key blank, for example. When User device 1 is to be shipped to Level 2, an authentication process is initiated between the system device SD1 and the user device UD1 using the encryption key "Key1". If the authentication process is successful, "Key1" stored in the user device is replaced by "Key2" and the process is terminated. The new encryption key "Key2" can be supplied either by the system device itself or optionally by a computer C1. No further successful authentication processes can subsequently be performed at this level between the user device in question and the system device as the encryption keys do not match.

The user device can now safely be shipped to Level 2, the locksmith, because a fraudulent party intercepting the user device will not be able to use it without knowledge of the hidden encryption key stored therein, i.e., "Key2".

At Level 2, a corresponding procedure as the one at Level 1 is performed before the user device is delivered to the end user, i.e., "Key2" stored in the user device is replaced by "Key3" by means of a system device SD2, possibly together with a computer C2.

A user device arriving at the end user level, Level 3, can not be used until it has been authorised by means of a system device SD3 in the same way as at Level 2. This means that the encryption key "Key3" is replaced by "Key4" after a successful authentication process using "Key3". All user devices, i.e., all keys and locks of the master key system must go through this process before they can be used. This also means that all "activated" user devices have the encryption key "Key4" stored therein and can therefore perform successful authentication processes between each other. This provides for full security when distributing keys or locks for an end user master key system.

A lock system comprising key and lock devices according to the invention will now be described in detail with reference to FIG. 2, which shows a typical distribution of hardware and software tools among different hierarchical levels, namely, customer 100, distributor 200 and manufacturer 300.

User Keys

In the customer system 100, there are several user keys 101 adapted for use with a number of locks 20. The user keys and the locks together constitute a master key system (MKS). Each key has a unique individual electronic code controlling its function. The electronic code is divided into different segments for the use of manufacturers, distributors, and customers. A public segment is provided for open information while a secret segment is provided for secret information. The segments are further divided into different electronic code elements or items. The electronic key code is further discussed below in connection with the description of protected modes.

Programming and Authorisation Key

There is at least one customer programming and authorisation key (C-key) 102 for a customer system 100. C-keys, together with D-keys and M-keys (see below), will also be referred to in this document as system keys (SYS-keys).

Customer Programming Box

At the customer, there is a programming box 106 adapted for connection to a computer (PC) 104 via e.g. a serial interface. This programming box comprises a static reader 107 and it is used for programming in the customer system. A static reader is a key reader without a blocking mechanism and thus comprise electronic circuits etc. for reading and programming a key.

Although a customer programming box is shown in the figure, this box can be omitted in very small lock systems.

Customer Software

The customer has access to the personal computer 104 running customer administration software (C-software) with open system information only. Thus, the C-software keeps track of which keys are authorised in which locks in the master key system in question in a so-called lock chart. However, secret identities (see below) of all keys are stored in encrypted form, which only can be read by means of a system key.

Authorisation Key for the Distributor

There is a distributor authorisation key (D-key) 202 for the distributor of the lock system, who can be e.g. a locksmith.

Distributor Programming Box

At the distributor, there is also a programming box 206 adapted for connection to a computer (PC) 204 via e.g. a serial interface. This programming box can be identical or similar to the one described in connection with the customer system 100.

Distributor Software

The distributor has a special computer software (D-software) for the personal computer 204. The D-software includes an open part for display of open system information and for design of changes etc. It also includes a secret part including authorisation codes and secret keywords used in the system. The D-software also supports encrypted communication to a manufacturer lock system computer 304 through e.g. a modem connection 208, as will be further discussed below.

The distributor software uses as a module a key/lock register, which describes the customer system. In that way, the distributor can work transparently as if the distributor and customer software were one system. This is necessary for the distributor if he is going to be closely involved with servicing the customer system.

Authorisation Key for the Manufacturer

There is a manufacturer authorisation key (M-key) 302 for the manufacturer of the lock system.

Manufacturer Programming Box

At the manufacturer, there is also a programming box 306 similar to the distributor programming box 206 and adapted for connection to a computer (PC) 304.

Manufacturer Software

The manufacturer has access to the personal computer 304 running software (M-software) with full authorisation for operations regarding additions and deletions of keys and locks.

Information Elements

All keys and locks have a unique electronic identity or code comprising several information elements controlling the function of the keys and locks. The information elements of a key or a lock will now be described with reference to FIG. 3*a* and 3*b*, respectively.

The electronic code is divided into different segments for the use of manufacturers, distributors and customers. Some public elements are common for devices of a MKS while a secret segment is provided for secret information and is always individual for the group.

Every electronic key code comprises the following parts:

Public Key ID (PKID) comprising
- Manufacturer identification (M)
- Master Key System identification (MKS)
- Function identification (F)
- Group ID (GR)
- Unique Identity (UID)

Encryption Key ($K_{DES}$)

Secret Key ID (SKID) comprising
- Secret group ID (SGR)

Correspondingly, every electronic lock code comprises the following parts:

Public Lock ID (PLID) comprising
- Manufacturer identification (M)
- Master Key System identification (MKS)
- Function identification (F)
- Group ID (GR)
- Unique Identity (UID)

Encryption Key ($K_{DES}$)

Secret Lock ID (SLID) comprising
- Secret group ID (SGR)

The basic elements will now be described in more detail.

M—Manufacturer

M identifies the manufacturer of the master key system. Thus, each manufacturer using the invention is assigned a unique M code identifying keys and locks originating from the manufacturer.

MKS—Master Key System

MKS identifies the different Master Key Systems 100. A lock will accept a user key or a C-key only if they have the same MKS code.

F—Function

F identifies the role of the device; whether it is a lock, a user key, a C-key, D-key, M-key etc.

GR—GRoup

GR is an integer identifying a group of devices. GR is unique in each MKS and starts at 1 with an increment of 1.

UID—Unique Identity

UID identifies the different users in a group. UID is unique in each group, starts at 1 with an increment of 1. Thus, the combination of group identifier and unique identity uniquely identifies a device in a MKS.

$K_{DES}$—Encryption Key

The $K_{DES}$ comprises a randomly generated encryption key. In the preferred embodiment, the DES encryption algorithm is used, partly because its speed, and preferably the Triple DES (3DES). There are several modes of operation of the DES encryption and two modes are preferred with the invention; ECB (Electronic Code Book) and CBC (Cipher Block Chaining).

$K_{DES}$ is identical in all devices in a master key system.

$K_{DES}$ is in no way readable from the outside and is only used by the algorithms executed internally of the key and lock devices. This is a very important feature as it eliminates the possibility to copy a key just by reading the contents of its memory. Furthermore, $K_{DES}$ is present only in keys in functional mode, see the discussion below of the protected mode.

$K_{DES}$ is used in the authorisation processes taking place between different devices. Thus, for a key to be able to operate a lock, both the key and the lock must have the same $K_{DES}$. Otherwise, the authorisation process will fail.

SGR—Secret Group

SGR is a randomly generated number that is the same for one group. The above mentioned information elements as well as other electronic data information used in a key and lock system according to the invention are of course information vital to the function of the system. Therefore, in order to ensure the integrity of the data, MAC (Message Authentication Code) is used for some of the data. In a key or lock device, it is used for each authorisation list in the chip using $K_{DES}$. It is also used for some data elements before the device is put into functional mode (see below) as well as for some other data elements. In the C-, D-, or M-software, MAC is used for some non-encrypted data files.

Figure 4:
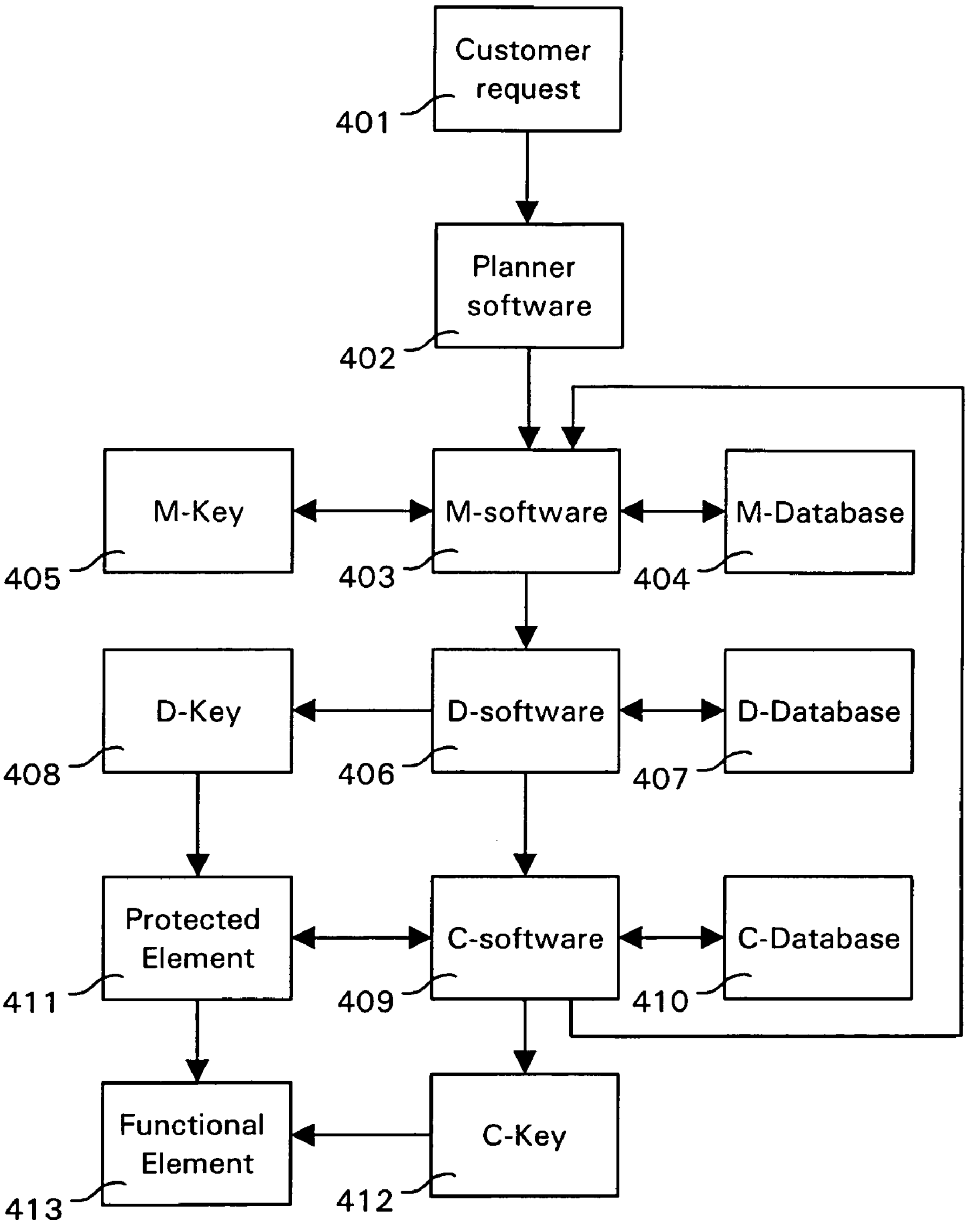
FIG. 4 is a figure showing an example of the information flow of the system shown in FIG. 2.

A key and lock system according to the invention displays a very high security level. The security architecture is based on the fact that a system key, i.e., a C-, D-, or M-key, can work with many different software. Thus, it is not easy to change the authentication encryption key for each authentication executed. A typical information flow in the hierarchical system shown in FIG. 2 is shown in FIG. 4. This figure exemplifies the complexity of the system and of the information exchanged between the different levels, i.e., manufacturer, distributor and customer.

In the example, the customer wants an addition of a user key to his master key system (step 401). Thus, using a planner software (step 402), information regarding the requested changes is transferred to the manufacturer through e.g. the modem connection 108-308, see FIG. 2. At the manufacturer 300, using the M-software 304 (step 403), the M-software database 304 is accessed (step 404) by means of an M-key (step 405). The M-software database is then updated and relevant information sent to the D-software (step 406), e.g. through the modem connection 308-208.

At the distributor 200, the D-software database 204 is accessed (step 407) and updated by means of a D-key 202 (step 408). A device in protected mode belonging to the MKS in question is procured and programmed by means of the D-key 202 and the programming box 206.

At the customer 100, the C-software 104 receives information from the distributor (step 409), e.g. by means of the modem connection. The C-software database is accessed (step 410) and updated and the new device delivered by the distributor (step 411) is programmed by means of the programming box 106 and a C-key 102 (step 412). When the protected device has been put into functional mode (step 413), the M-software 304 is alerted of that fact and the M-software database updated accordingly.

The reader realises the complexity of all these operations and the need for a simple and yet secure way of transferring electronic information as well as the key or lock device itself.

Protected Mode

To address the problem of secure transfer of a device to a customer or a distributor, for example, a feature of the lock and key device according to the invention is the so-called protected mode. This essentially means that users at the different hierarchical levels, i.e., manufacturer, distributor, and end user have full control of the authorisation of the devices belonging to the system.

This is accomplished by the use of the variable encryption key stored in the electronic key code of the device. The function of this variable encryption key will be described in the following with reference to FIGS. 5*a*–*e*, wherein the electric code content stored in an electronic memory of a device is shown.

Initially, a blank device is made at the manufacturer, i.e., a device without mechanical or electronic coding. Thus, the electronic code memory is empty, see FIG. 5*a*.

The next step at the manufacturer is to add the code element specific for the manufacturer in question, see FIG. 5*b*. This second element, labelled "M", designates the specific manufacturer and is unique for each manufacturer. Thus, it is possible just by reading the M element to find out from which manufacturer a key originates.

The element labelled "$K_{DES-M}$" is the DES encryption key used by the manufacturer M as a transportation or storage code. As already stated, the encryption key $K_{DES}$ necessary for operating devices is only present in devices in functional mode, i.e., activated keys and locks operable in a customer MKS 100. The $K_{DES-M}$ key is provided by the manufacturer software (M-software) and it is not possible for anyone but the manufacturer having the M-software to provide a key blank with the unique $K_{DES-M}$ key for that specific manufacturer. In that way, keys are protected during storage at the manufacturer because they are useless for anyone but the correct manufacturer.

When the manufacturer is about to send a device to a distributor, an electronic code element specific for the distributor in question is added, see FIG. 5*c*. This element, labelled "D", designates the specific distributor and is unique for each distributor. This is stored in the position normally used by the MKS code.

At the same time, at the manufacturer, the encryption key $K_{DES-M}$ is replaced with $K_{DES-D}$, an encryption key unique for the distributor in question. However, to be able to carry out this change, an authentication process must be performed between the manufacturer protected key and the M-key. This authentication process is successful only if the encryption keys of the manufacturer protected device and the M-key, i.e., $K_{DES-M}$, are identical. The encryption key $K_{DES-D}$ is stored in the M-software, from where it is retrieved after a successful authentication process. Provided with the $K_{DES-D}$ encryption key, the device is in distributor protected mode.

When an order is placed by a customer, either to the manufacturer or to the distributor, a process to place the key in customer protected mode is initiated, as described with reference to FIG. 4. Information needed for this process is then sent electronically from the manufacturer software to the distributor, but not in plain text. Instead, it is sent encrypted with the distributor encryption key $K_{DES-D}$. For example, the customer encryption key $K_{DES-C}$ for devices in customer protected mode is sent in the following format:

$$eK_{DES-D}(K_{DES-C})$$

Other relevant information elements, such as MKS, GR, UID, $K_{DES}$, and, if no customer protected mode is used, $K_{DES—C}$, are sent encrypted in the same way. This information is then downloaded into the distributor protected key.

In order to decrypt the encrypted information, an authentication process must take place at the distributor. This process takes place between the protected device and the D-key, in which the $K_{DES-D}$ encryption key is stored. The code elements are thus decrypted, whereby the distributor protected device shown in FIG. 5*c* is transformed into a customer protected device shown in FIG. 5*d*. At the same time, the correct function code element "F" is stored, indicating the function of the element, e.g. as a user key.

However, the device leaving the distributor can not yet be used in the final master key system of the customer, i.e., it is not in functional mode. By means of the C-software and a C-key, the customer accepts the customer protected device and replaces the $K_{DES-C}$ encryption key with $K_{DES}$, see FIG. 5*e*. Only then can the device be used in the master key system.

The C-key is normally supplied from the manufacturer directly to the customer. The expression "customer protected mode" refers to the fact, that no other than the correct, authorised customer can use a key delivered by a distributor because the lock system keys must the accepted by the system by means of a C-key.

The feature that a physical key, i.e., a system key is used for changing the code of another device several advantages. Firstly, a physical key is easy to handle. Secondly, it provides for a secure system. No one can put a device into functional mode without a correct system key (e.g. C-key).

In an alternative embodiment of the invention, the distributor step is omitted. Thus, the manufacturer is responsible for the steps described with reference to FIGS. 5*a–c* and delivers both the devices and the system key to the customer. This does not affect the security of the system as long as the devices and the system keys are delivered separately.

Alternatively, if the customer so requests, the key can be delivered to the customer in functional mode, i.e., with the $K_{DES}$ already stored. That would give a less secure system but the possibility to omit one or several steps shows the flexibility of the protected mode concept.

As already stated, the F information element—the Function element—of the electronic code determines the role of the device. This element is "0", i.e., undefined during storage at the manufacturer or distributor and is given a predetermined value when the key is put into functional mode. The value depends on the role of the key; whether it is a lock or a user, C-, D-, or M-key. The exact way this identification is made is not important to the invention.

Data Exchange Security

Figure 6:
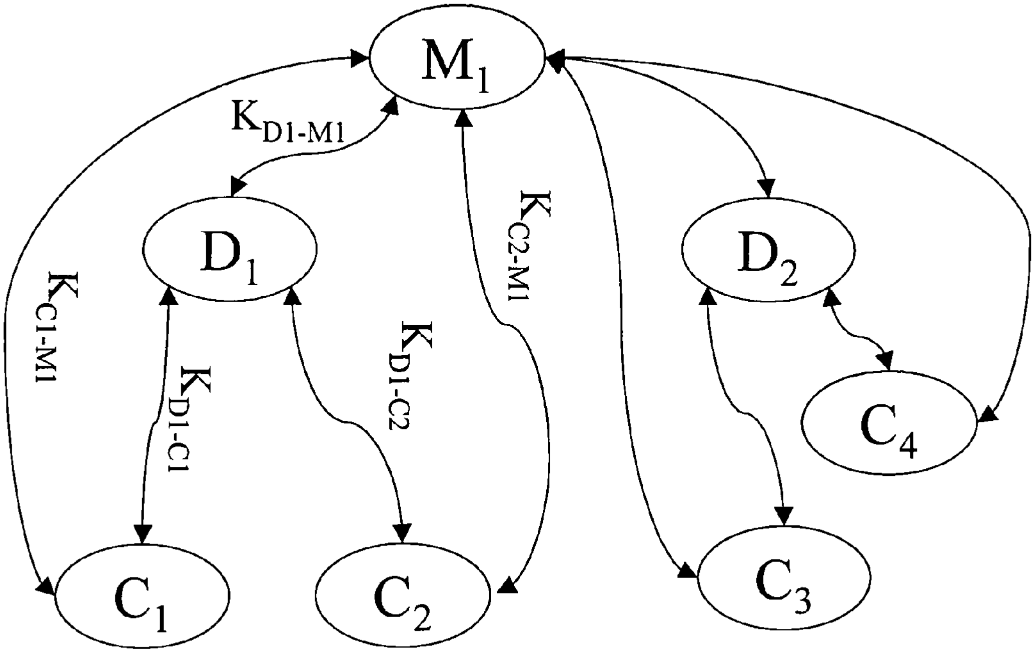
FIG. 6 is a diagram exemplifying security for data exchange between manufacturer, distributor and customer.

In the following, the security aspects of the data exchange between software on the different hierarchical levels will be discussed with reference to FIG. 6. Each pair of manufacturer-distributor, manufacturer-customer and distributor-customer has its own encryption key in order to ensure sufficient security. However, the same encryption keys are used in both directions, e.g. both from a distributor to a customer and vice versa. All required encryption keys are stored in the software in question. The encryption keys are delivered together with the software but if the encryption keys have to be updated, new encryption keys are sent encrypted with the current communication encryption keys from the manufacturer.

Users and System Keys

Figure 2:
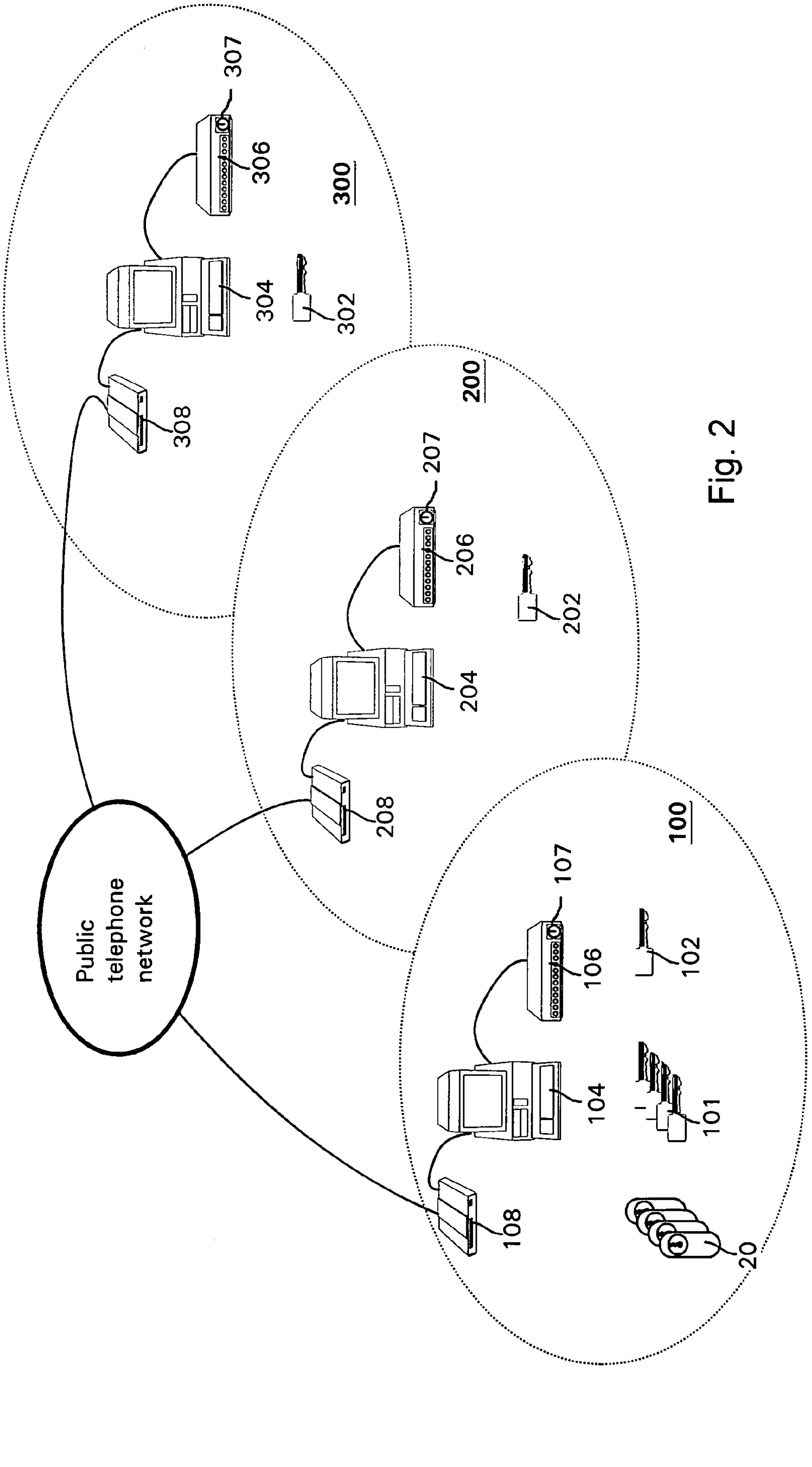
FIG. 2 is an overall view of a hierarchical lock system with lock and key devices according to the invention.

Every user of the system shown in FIG. 2 has to be identified by the software used. To this end, each user has his/her own unique username and belongs to one of three user categories: superuser, read/write, or read only. The different categories have different privileges and access restrictions, which will be discussed briefly in the following.

A superuser can change user rights and system keys ownership. He can also change password and PIN code of all system keys and users and change C-key authorisation in software. Furthermore, he can perform all operations allowed to a read/write user. In order to get access to a software, a superuser needs a special system key, a so-called master system key and to enter a PIN code. There is only one master system key for each software.

A read/write user can change authorisation in the lock chart of a MKS. He can also decrypt and encrypt file for transfer to other software of the system. In order to get access to a software, a read/write user needs an authorised system key and to enter a PIN code.

In order to get access to a software, a read only user needs a key belonging to the MKS and to enter a password. A read only user can only read the configuration of a lock system, i.e., view a lock chart and can not make any authorisation changes etc.

There is also an authentication protocol between user, system keys and the different software used. A software identification encryption key $K_{SWIDj}$ is stored in software in an encrypted file. The encryption key $K_{SWIDj}$ is unique for each system key and the full authentication process follows the following steps: First, public identities are exchanged between software and system key. The user then inputs username and PIN code. The software then verifies the authenticity of the system key in a way similar to what is described below under the heading "Database security" using the above mentioned unique software identification encryption key.

Database Security

Figure 7:
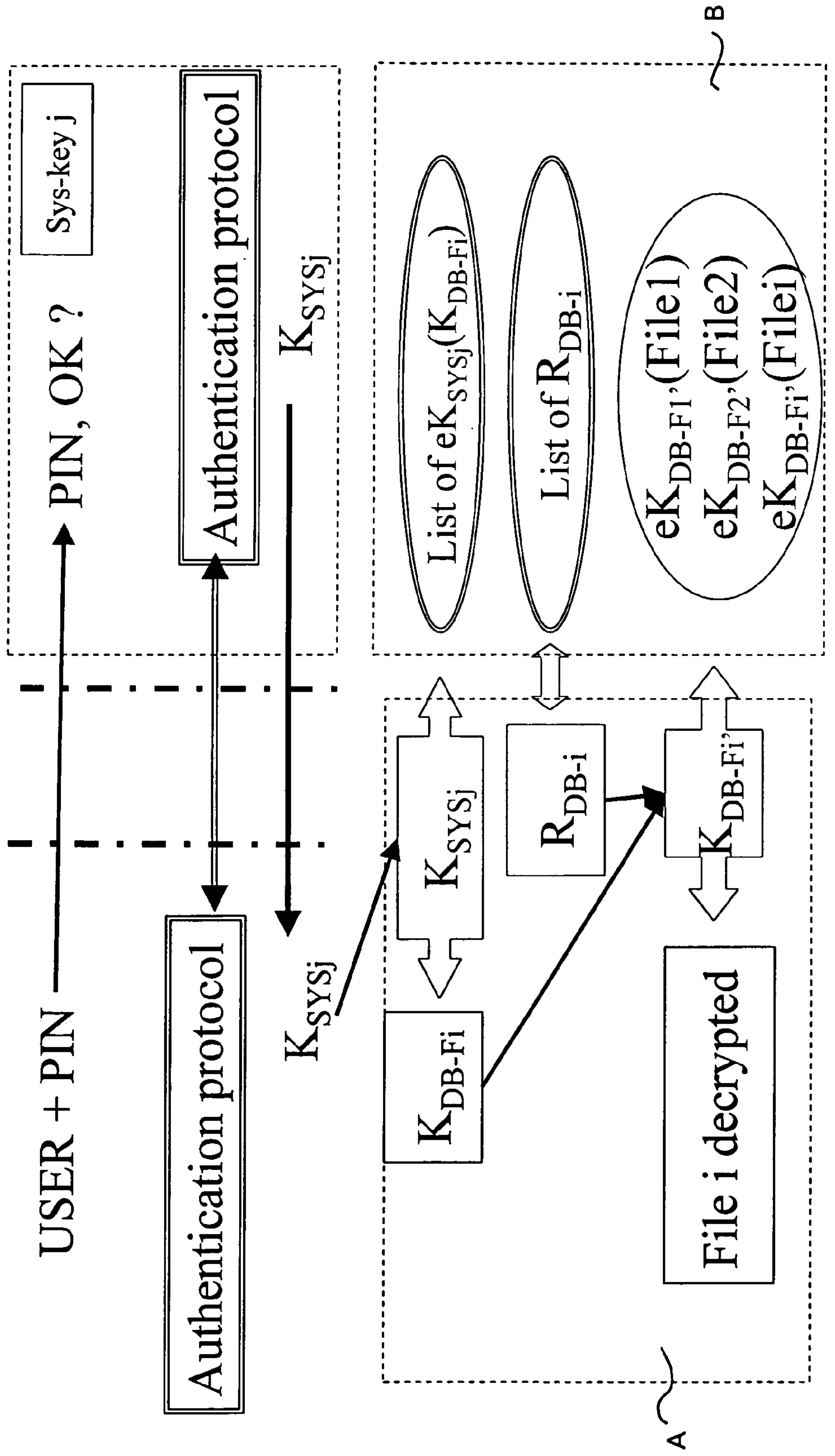
FIG. 7 is an overview of the database encryption used with the invention.
Figure 8:
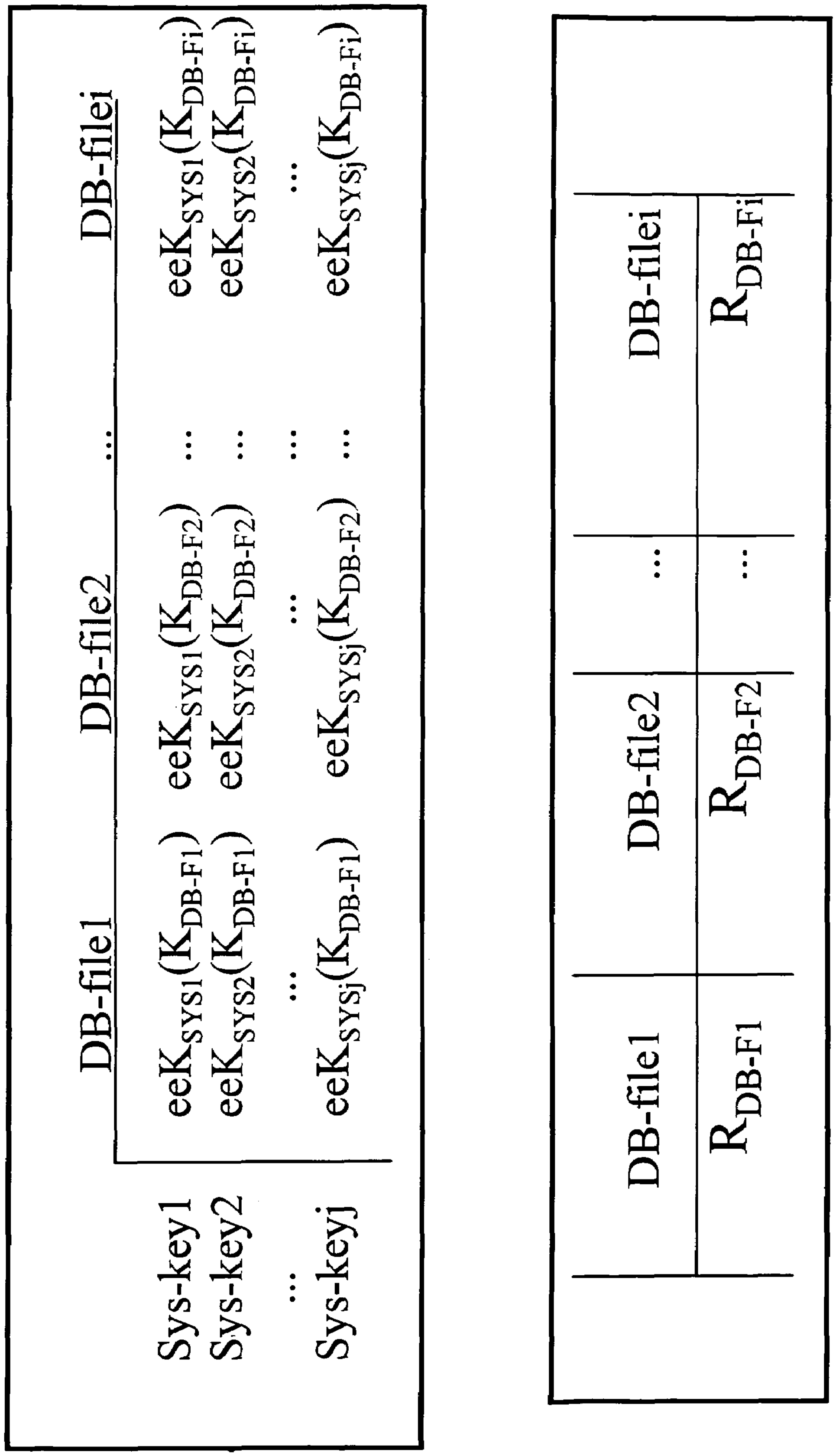
FIG. 8 shows exemplary database file encryption tables.

In the following, aspects on database security will be discussed with reference to FIGS. 7 and 8, which shows the database encryption used with the system shown in FIG. 2. In one MKS, different information items are stored in different files. This means that if an encryption key is broken, just a part of the database has been broken. Examples of different information elements are:

.File1—lock chart

.File2—list of keys and locks with their public identity (PID)

.Filei

Each of these files is encrypted with a separate encryption key, in the example named $K_{DB-F1}$, $K_{DB-F2}$, . . . $K_{DB-Fi}$, see FIG. 7.

A user accessing a software will give his/her username and a PIN code (unless in case of a read only user, wherein a password is input instead). The user also uses a system key j and an authentication process is initiated. Assuming a successful authentication process, an encryption key $K_{SYSj}$ stored in the system key j used for accessing the software is used in the following decryption processes. As is seen in FIG. 7, $K_{SYSj}$ is used when retrieving the set of encrypted encryption keys $K_{DB-F1}$, $K_{DB-F2}$, . . . $K_{DB-Fi}$, etc. used for encryption of the database files 1, 2, 3 etc. Thus, the encryption keys $K_{DB-F1}$, $K_{DB-F2}$, . . . $K_{DB-Fi}$, etc. are themselves stored encrypted with the encryption key $K_{SYSj}$ and are decrypted by means of that encryption key stored in the authorised physical system key.

In order to read file1, for example, the decrypted key $K_{DB-F1}$ is used for decrypting the information stored in the database. However, in order further to increase security, the encryption key of a file is modified each time the file is accessed. This is carried out by means of a modifier, $R_{DB-i}$ in FIGS. 7 and 8. The actual encryption key used for decrypting a particular file is called $K_{DB-F1-mod}=K_{DB-Fi}\oplus R_{DB-i}$. Each time Filei is stored, a new $R_{DB-1}$ is calculated, the file i is encrypted with the new $_{DB-F1-mod}$ and the new $R_{DB-i}$ is stored in clear.

It is important that encryption keys used are not stored for an unnecessarily long period of time. Therefore, see FIG. 7, the data elements surrounded by the box A are stored in primary memory only and not on disk. The data elements and information files surrounded by the box designated B in FIG. 7 are stored on disk. This solution provides for a secure storing of the key database, as the encryption keys exist in the computer only for as long as it is turned on. So for example, if a computer with a database is stolen, there is no danger that the decrypted encryption keys will be present in the computer system.

Identification Procedure

When a key is inserted into a lock, an identification procedure is initiated. This identification procedure is based on the use of encrypted keys and is further described in our co-pending application SE-9901643-8, to which reference is made. However, the important feature is that two devices communicating with each other must have the same encryption key in order to successfully perform a process, such as an authentication process.

Preferred embodiments of the invention have been described above. The person skilled in the art realises that the lock device according to the invention can be varied without departing from the scope of the invention as defined in the claims. Thus, although DES encryption has been described in connection with the preferred embodiment, other encryption methods can be used as well.

What is claimed is:

1. A method of authorizing a user device of a key and lock system, wherein said user device is a user key or a lock of a master key system, wherein the master key system enables various persons with different access authorizations to access all relevant items with only one key, the method comprising the following steps:

creating said user device having an electronic circuitry comprising an electronic code memory and being arranged to carry out software operations, creating a first system device having an electronic circuitry and being used in a first level of said key and lock system, storing a first encryption key in said user device and said first system device, carrying out an authentication process between said user device and said first system device using said first encryption key, and in case said authentication process was successful, carrying out a software operation by said first system device, by which software operation said encryption key stored in said first user device is replaced by a second encryption key, wherein said second encryption key is stored in second system devices and further user devices used in a second level of said key and lock system, thereby making said user device operable with said second system and further user devices, and wherein, also during the authentication process, said electronic encryption keys in the system devices and first and further user devices are unreadable from outside said electronic circuitry and only used by algorithms executed internally in the user device and wherein, when an encryption key used by the algorithms internally in the user device result in the successful authentication, the encryption key is replaced with another key of a different level.

2. The method according to claim 1, wherein, during the step of replacing said first encryption key stored in said user device, said second encryption key is supplied by said first system device.

3. The method according to claim 1, wherein, during the step of replacing said first encryption key stored in said user device, said second encryption key is supplied by a computer.

4. The method according to claim 3, comprising the additional step of supplying said second encryption key to said computer through a network including local networks and public telephone networks.

5. The method according to claim 1, wherein said first system device is a system key of a master key system, wherein the master key system enables various persons with different access authorizations to access all relevant items with only one key.

6. The method according to claim 1, wherein said user device is a user key of a master key system, wherein the master key system enables various persons with different access authorizations to access all relevant items with only one key.

7. The method according to claim 1, wherein said user device is a lock of a master key system.

8. An electromechanical key and lock device of a master key system, wherein the master key system enables various persons with different access authorizations to access all relevant items with only one key, said key and lock device comprising:

an electronic circuitry having an electronic memory adapted for storing an electronic code and being arranged to carry out software operations, said electronic code uniquely identifying the device and comprising a first electronic encryption key, wherein said first encryption key being adapted to be replaced by a second encryption key by means of an authenticated software operation carried out by a first system device having said first encryption key and being used in a first level of a lock system, and said second encryption key is stored in system and user devices used in a second level of said lock system, thereby making said user device operable with said second system and user devices, and wherein, also during the authentication process, said electronic encryption key stored in the system and user devices are unreadable from outside said electronic circuitry and only used by algorithms executed internally of the key and lock device and wherein, when the electronic encryption key used by the algorithms executed internally of the key and lock device result in the successful authentication, the electronic encryption key is replaced with another key of a different level.

9. The device according to claim 8, wherein said first system device is a key having a programmable electronic circuitry.

10. The device according to claim 8, wherein said electronic encryption keys are unreadable from outside said electronic circuitry.

11. A key and lock master key system, wherein the master key system enables various persons with different access authorizations to access all relevant items with only one key, said system comprising:

a plurality of user devices comprising:

a plurality of user keys having an electronic circuitry comprising an electronic memory adapted for storing a variable electronic encryption key and being arranged to carry out software operations, and a plurality of locks having an electronic circuitry comprising an electronic memory adapted for storing a variable electronic encryption key, wherein a user key and a lock are operable only if there are stored identical encryption keys in said user key and the lock, at least one system device having an electronic circuitry comprising an electronic memory adapted for storing a permanent electronic encryption key, and a computer program software adapted to change the variable electronic encryption key of a user device from a first to a second encryption key as a result of a successful authentication process carried out between a lock or user key having a stored variable electronic encryption key, and a system device having an identical encryption key as said lock or user key, wherein said second encryption key is stored in second system devices and user devices used in a second level of said key and lock system, thereby making said user devices operable with said second system and user devices, and wherein, also during the authentication process, said electronic encryption keys in the system and user devices are unreadable from outside said electronic circuitry and only used by algorithms executed internally in the user devices and wherein, the encryption key used by the algorithms internally in the user device result in a successful authentication, the encryption key is replaced with another key of a different level.

* * * * *